United States Patent [19]

Kranich, Jr.

[11] 4,213,882

[45] Jul. 22, 1980

[54] PREPARATION METHOD FOR CATALYST SUPPORT AND MATERIALS PRODUCED THEREBY

[75] Inventor: Herbert Kranich, Jr., Littleton, Colo.

[73] Assignee: Johns-Manville Corporation, Denver, Colo.

[21] Appl. No.: 712,633

[22] Filed: Aug. 9, 1976

[51] Int. Cl.$^2$ .................. B01J 29/06; B01J 35/00
[52] U.S. Cl. ............................ 252/455 R; 252/477 R
[58] Field of Search ................ 252/449, 455 R, 477 R

[56] References Cited

U.S. PATENT DOCUMENTS

| | | | |
|---|---|---|---|
| 1,212,648 | 1/1917 | Krieger | 252/449 |
| 2,283,174 | 5/1942 | Bates et al. | 252/449 |
| 2,691,598 | 10/1954 | Meurice et al. | 252/449 |
| 2,840,618 | 6/1958 | Hecht | 252/477 R |
| 3,235,512 | 2/1966 | Koepernik | 252/455 R |
| 3,526,602 | 9/1970 | Kobayshi et al. | 252/477 R |

Primary Examiner—Carl F. Dees
Attorney, Agent, or Firm—Robert M. Krone; Joseph J. Kelly; James W. McClain

[57] ABSTRACT

A method of preparation of catalyst supports as disclosed, as well as supports made by the method. Natural diatomite, bentonite clay, corn meal and water are mixed, extruded, pelleted, dried and calcined to form porous catalyst support pellets.

9 Claims, No Drawings

PREPARATION METHOD FOR CATALYST SUPPORT AND MATERIALS PRODUCED THEREBY

BACKGROUND OF THE INVENTION

The invention herein relates to a method for producing catalyst supports, and the catalyst supports produced by such method.

Porous catalyst supports are widely used in the various chemical industries. Such supports are normally highly porous pellets composed primarily of silica or mixtures of silica and alumina. The porous nature of the pellets gives them considerable surface area. On the surfaces are deposited small amounts of catalytically active materials, such as metals or acids. Use of a support with a catalytically active material greatly increases the efficiency of use of the latter, for by spreading the material over a large surface area much more of its catalytically active surface is exposed to the chemicals whose reaction it is to catalyze.

The precise nature of the catalyst support will depend on the particular catalytic reaction for which it is to be used. Thus there are many significant differences in the preparation processes for the different catalyst supports so that parameters such as pore size and effective surface area can be controlled.

SUMMARY OF THE INVENTION

The invention herein is a process for the formation of a siliceous catalyst support which comprises:
 (a) forming a mixture comprising, in parts by weight:
  natural diatomite—55-70 parts
  bentonite clay—15-25 parts
  corn meal—15-20 parts
and sufficient water to impart an extrudable consistency;
 (b) extruding the mixture through a die to form an extrudate and then separating the extrudate into a plurality of pellets;
 (c) drying the pellets for at least 20 minutes at a temperature of at least 150° F. (65° C.), with the time and temperature being selected such that the corn meal is substantially completely dried; and
 (d) calcining the dried pellets at a temperature of at least about 1150° F. (620° C.) for at least about 30 minutes, until the corn meal is substantially completely removed from the pellets leaving a higly porous solid composite pellet of diatomite and clay.

DETAILED DESCRIPTION AND PREFERRED EMBODIMENT

The invention herein resides in a process for the formation of a catalyst support from a mixture of raw materials comprising four components: natural diatomite, bentonite clay, corn meal and water.

Natural diatomite is a highly siliceous material composed of the remains of microscopic plants, which remains have over the centuries become collected in large deposits where ancient bodies of water once existed. Typical natural diatomites are composed of approximately 80-90% by weight of silica, 1-10% by weight of iron oxides and aluminum oxides, and smaller amounts of materials such as calcium oxide, magnesium oxide and alkali metal oxides. Diatomites are normally "produced" by being mined, crushed and graded to different particle sizes. The natural diatomites commonly have lower silica contents than calcined or flux calcined diatomites. In this invention the natural diatomite will be present in the raw materials mixture in an amount of from 55-70 parts by weight, preferably about 60-65 parts by weight.

The second component of the raw material mixture is bentonite clay, a form of montmorillonite clay. Bentonite clays are hydrous aluminum silicates normally containing significant portions of sodium, magnesium and calcium oxides. Such clays are described in Dana, *Textbook of Mineralogy* (1932). In the present invention the bentonite clay will be present as from 15-25 parts by weight of the raw materials mixture, preferably about 18-22 parts by weight.

The third component of the invention is corn meal. Normally the corn meal used in the present invention will be of polenta grade or equivalent food grade. Lesser grades such as animal feed grades are normally found to contain too much residual corn husk, which leads to difficulties in the subsequent extrusion of the raw material mixture. The corn meal component of the present mixture will be present as 15-20 parts by weight of the composition.

The fourth component of the mixture is water in a sufficient amount to cause the mixture of natural diatomite, bentonite clay, corn meal and water to take on an extrudable consistency. It will normally be well within the skill of one versed in the art to determine the appropriate amount of water to be added to the dry solids to form a readily extrudable material in the particular type of extrusion equipment being used. In experiments run in the present invention, it has been found that satisfactorily extrudable mixtures can be formed with approximately 0.6 pounds of water per pound of dry solids. Generally the ratio of water to dry solids should be approximately about 0.40 to 0.75 part by weight of water per part by weight of dry solids. The same experiments have indicated that approximately 3-20 minutes of mixing the water and dry solids, and preferably about 5-10 minutes of mixing, have yielded entirely satisfactory extrudable mixtures.

After the mixture of natural diatomite, bentonite clay, corn meal and water is formed into the extrusion feed, it is extruded in conventional extrusion equipment through a die to form an extrudate from which individual pellets may be separated. Most commonly the extrudate is an elongated rod-like material of circular, oval or square cross-section. Circular cross-sections are preferred to minimize attrition of the pellets in subsequent handling. Normally the extruded rod is approximately ⅛ inch to ⅜ inch (approximately 3 mm to 10 mm), preferably approximately ⅛ inch to 3/16 inch (approximately 3 mm to 5 mm) in width or diameter. The extruded rod is commonly severed at intervals approximately equal to the diameter or width of the rod such that cylindrical or cubical pellets having approximately equal dimensions in all directions are formed. Conventional severing equipment such as wire knives can be used.

After the extruded pellets are formed they are dried in conventional drying units such as continuous belt dryers. Quite satisfactory materials have been made using a three-zone dryer in which temperature ranges between about 150° F. (65° C.) and 400° F. (204° C., although temperatures may be as high as about 500° F. (260° C.) if desired. Drying will be for at least 20 minutes and preferably on the order of about 25 to 30 minutes. The time and temperature relationships must be such that during the drying period all moisture is removed. After drying has been completed the pellets may be allowed to cool and are screened to remove any pellets which are over or under the desired size range.

Thereafter the dried pellets are calcined or fired in calcining equipment such as rotary kilns at a temperature of at least about 1150° F. (620° C.) for at least about 30 minutes. Calcining may be at temperatures as high as 1450° F. (790° C.) and will preferably be at temperatures on the order of about 1250° F. to 1350° F. (676° C. to 732° C.). The calcining time will be at least 30 minutes and will normally be on the order of about 1 hour. Calcining in an oxygen containing atmosphere should continue until all corn meal in the dried pellets has been burned out of the pellets leaving a highly porous solid composite pellet of fused diatomite and clay. If desired, additional air injection can be used at approximately the midpoint of the calcination kiln to enhance the calcination; an air lance is quite suitable for such air injection. Following calcining the catalyst support pellets are screened to remove over- and undersized pellets and then weighed into containers such as bags for shipping.

As a specific example of this invention, catalyst supports have been made as follows. The following raw materials were mixed to an extrudable substance:

| | |
|---|---|
| natural diatomite (Commercial natural diatomite sold by Johns-Manville Corp. under the Trademark "CELITE FC" | 300 lbs |
| bentonite clay | 100 lbs |
| corn meal (polenta grade) | 80 lbs |
| water | 32 gals |

These materials were mixed for about 15 minutes, milled in a pug mill, and then fed to an extruder where the mixture was extruded through a ¼" (6.4 mm) circular die. The extruded rod was cut at 3/16" (4.8 mm) intervals into pellets. These pellets were then dried at about 180° F. to 320° F. (82° C. to 165° C.) for a period of 25 minutes. They were thereafter calcined and screened. The calcination occurred in a rotary kiln having a pitch of 9/32" per foot (2.3 cm per meter) and a rotation speed of 1.3 RPM. Calcing temeprature was maintained at about 1250° F. (676° C.) and the pellets calcined for about 1 hour. The pellets were then screened to remove offsize material.

What I claim is:
1. A process for the formation of a siliceous catalyst support which comprises:
    (a) forming a mixture consisting essentially of, in parts by weight:
    natural diatomite—60–65 parts
    bentonite clay—18–22 parts
    corn meal—15–20 parts
    and sufficient water to impart an extrudable consistency;
    (b) extruding said mixture through a die to form an extrudate and then separating said extrudate into a plurality of pellets;
    (c) drying said pellets for at least about 20 minutes at a temperature of at least about 150° F., the time and temperature being selected such that all moisture is removed; and
    (d) calcining said dried pellets at a temperature of at least about 1150° F. for at least about 30 minutes, until said corn meal is substantially completely removed from said pellets leaving a highly porous solid fused composite pellet of diatomite and clay.
2. A process as in claim 1 wherein said water is present in said mixture in a ratio of about 0.40 to 0.75 parts by weight of water per part by weight of dry solids.
3. A process as in claim 1 wherein said drying step is conducted at a temperature in the range of 150° F. to 500° F.
4. A process as in claim 3 wherein said drying step is conducted at a temperature in the range of about 150° F. to 300° F.
5. A process as in claim 1 wherein said drying step is conducted for a period of from 20 30 minutes.
6. A process as in claim 1 wherein said calcining step is conducted at a temperature in the range of about 1150° F. to 1450° F.
7. A process as in claim 6 wherein said calcining step is conducted at a temperature in the range of about 1250° F. to 1350° F.
8. A process as in claim 6 wherein said calcining step is conducted for a period of about 30 to 60 minutes.
9. A catalyst support produced by the process of claim 1.

* * * * *

UNITED STATES PATENT AND TRADEMARK OFFICE
CERTIFICATE OF CORRECTION

PATENT NO. : 4,213,882
DATED : July 22, 1980
INVENTOR(S) : Herbert Kranich, Jr.

It is certified that error appears in the above—identified patent and that said Letters Patent is hereby corrected as shown below:

Column 1 - Line 48 "higly" should be "highly."

Column 4 - Line 35 "20  30 minutes" should be "20 to 30 minutes".

Signed and Sealed this

Tenth Day of February 1981

[SEAL]

Attest:

RENE D. TEGTMEYER

Attesting Officer     Acting Commissioner of Patents and Trademarks